United States Patent [19]

Lake et al.

[11] Patent Number: 5,730,761
[45] Date of Patent: *Mar. 24, 1998

[54] METHODS OF PRODUCING THIN PROFILE BATTERIES AND A PLURALITY OF BATTERY TERMINAL HOUSING MEMBERS

[75] Inventors: Rickie Lake; Peter M. Blonsky, both of Boise, Id.

[73] Assignee: Micron Communications, Inc., Boise, Id.

[*] Notice: The term of this patent shall not extend beyond the expiration date of Pat. No. 5,603,157.

[21] Appl. No.: 736,378

[22] Filed: Oct. 24, 1996

Related U.S. Application Data

[63] Continuation of Ser. No. 205,590, Mar. 2, 1994, Pat. No. 5,603,157.

[51] Int. Cl.⁶ .................................................. H01M 2/08
[52] U.S. Cl. .................. 29/623.2; 29/623.5; 427/388.1; 427/510
[58] Field of Search .................. 427/388.1, 468, 427/510, 386; 29/623.2, 623.4, 623.5

[56] References Cited

U.S. PATENT DOCUMENTS

| | | | |
|---|---|---|---|
| 2,422,045 | 6/1947 | Ruben | 126/167 |
| 2,516,647 | 7/1950 | Rogers et al. | 413/19 |
| 2,712,565 | 7/1955 | Williams, Jr. | 136/107 |
| 2,951,891 | 9/1960 | Kempf | 136/169 |
| 3,096,217 | 7/1963 | Clune | 136/107 |
| 3,185,595 | 5/1965 | Schenk, Jr. | 136/133 |
| 3,440,110 | 4/1969 | Arbter | 136/166 |
| 3,457,117 | 7/1969 | Angelovich | 136/133 |
| 3,551,191 | 12/1970 | Elbling et al. | 427/386 X |
| 3,663,000 | 5/1972 | Ruetschi | 136/107 |
| 3,708,343 | 1/1973 | Walsh | 136/133 |
| 3,713,896 | 1/1973 | Feldhake | 136/133 |
| 3,799,959 | 3/1974 | Epstein | 260/429 |
| 3,891,462 | 6/1975 | Langkau | 136/111 |
| 3,935,026 | 1/1976 | Howard | 136/20 |
| 4,048,405 | 9/1977 | Megahed | 429/206 |
| 4,122,241 | 10/1978 | Ciliberti, Jr. et al. | 429/133 |
| 4,216,045 | 8/1980 | Morioka | 156/242 |

(List continued on next page.)

FOREIGN PATENT DOCUMENTS

| | | | |
|---|---|---|---|
| 1099018 | 11/1959 | Germany | 10/1 |
| 2201811 | 1/1972 | Germany | 21/84 |
| 0152235 | 11/1981 | Germany | 429/174 |
| 62-229760 | 10/1987 | Japan | H01M 2/02 |

*Primary Examiner*—Stephen Kalafut
*Attorney, Agent, or Firm*—Wells, St. John, Roberts, Gregory & Matkin, P.S.

[57] ABSTRACT

A method of forming a button-type battery, includes: a) providing an electrically conductive sheet having an exposed surface which is divisible into a plurality of areas; b) depositing an uncured electrically insulative gasket material onto the conductive sheet into a plurality of the areas, the gasket material being deposited to define at least one discrete pattern within the respective deposited areas, the respective discrete patterns covering less than a total of their respective areas; c) curing the deposited gasket material; d) cutting and forming a plurality of discrete first terminal housing members from the areas of the conductive sheet, the respective first terminal housing members comprising at least a portion of one of the discrete patterns of gasket material; d) providing a discrete electrically conductive second terminal housing member in facing juxtaposition to one of the first terminal housing members; e) providing an anode and a cathode having a separator and electrolyte positioned therebetween; the anode, cathode, separator and electrolyte being positioned intermediate the juxtaposed first and second terminal housing members; the anode being positioned to electrically connect with one of the first or second terminal housing members and the cathode being positioned to electrically connect with the other of the first or second terminal housing members; and f) crimping the first and second terminal housing members together into an enclosed battery housing with the gasket material being interposed between the first and second terminal housing members to provide a fluid-tight seal and to provide electrical insulation therebetween.

15 Claims, 4 Drawing Sheets

U.S. PATENT DOCUMENTS

| | | | |
|---|---|---|---|
| 4,263,380 | 4/1981 | Riedl | 429/162 |
| 4,374,909 | 2/1983 | Tucholski | 429/174 |
| 4,421,784 | 12/1983 | Troue | 427/510 X |
| 4,632,887 | 12/1986 | Jung | 429/181 |
| 4,732,825 | 3/1988 | Kamata et al. | 429/174 |
| 4,758,808 | 7/1988 | Sasaki et al. | 333/185 |
| 4,770,921 | 9/1988 | Wacker et al. | 428/209 |
| 4,978,503 | 12/1990 | Shanks et al. | 422/58 |
| 5,227,264 | 7/1993 | Duval et al. | 429/153 |
| 5,240,747 | 8/1993 | Matsuda et al. | 427/510 X |
| 5,430,564 | 7/1995 | Harada et al. | 359/62 |
| 5,584,891 | 12/1996 | Tuttle | 29/623.5 X |
| 5,603,157 | 2/1997 | Lake et al. | 29/623.4 |
| 5,631,049 | 5/1997 | Boldt | 427/510 X |

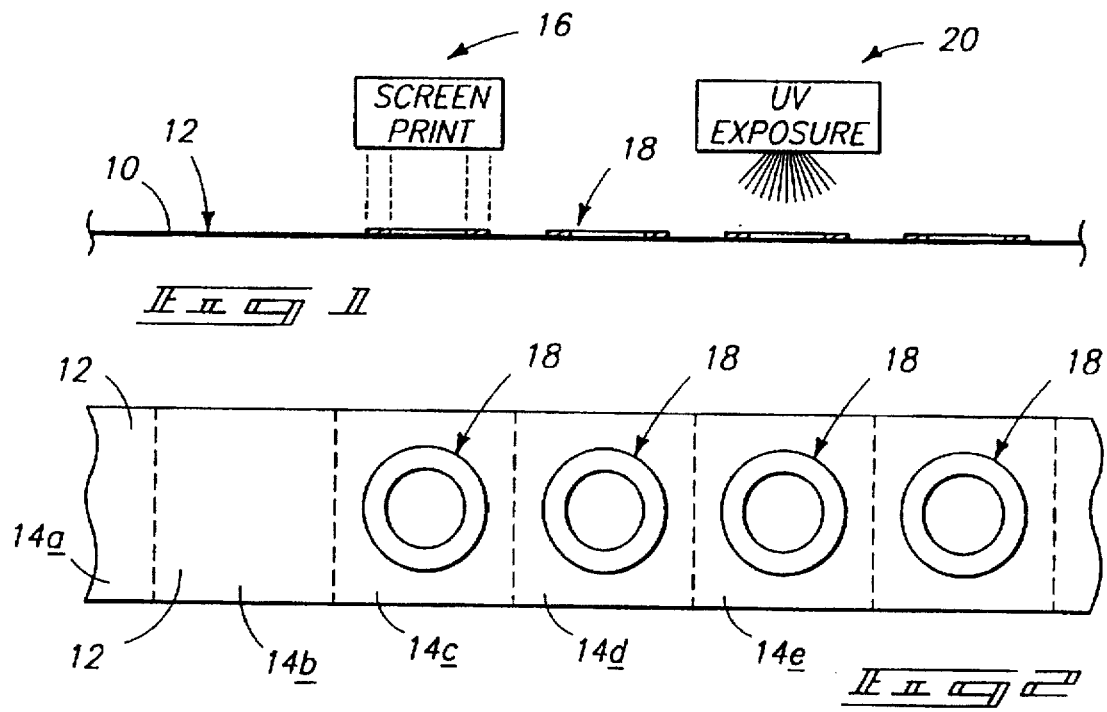
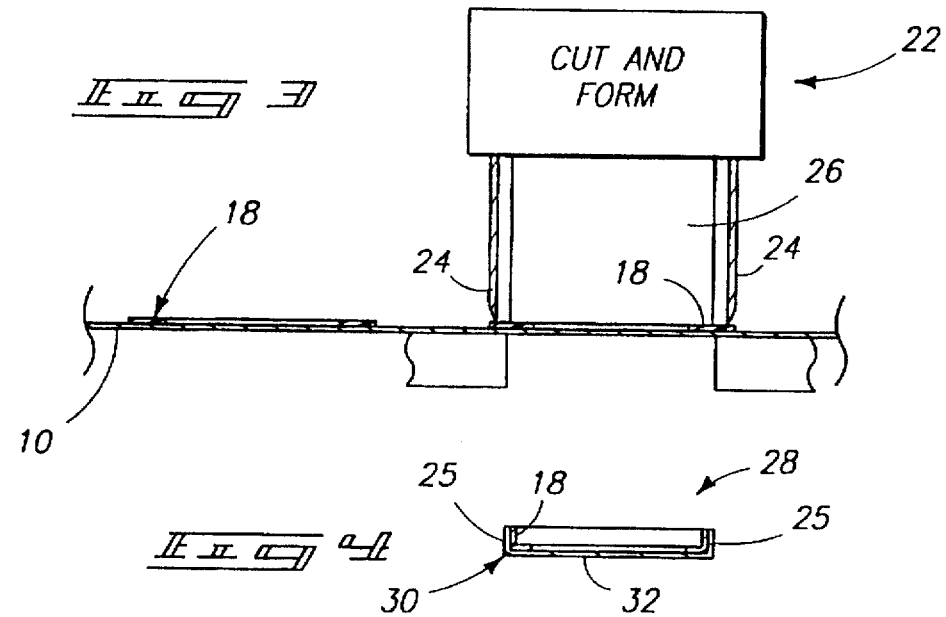
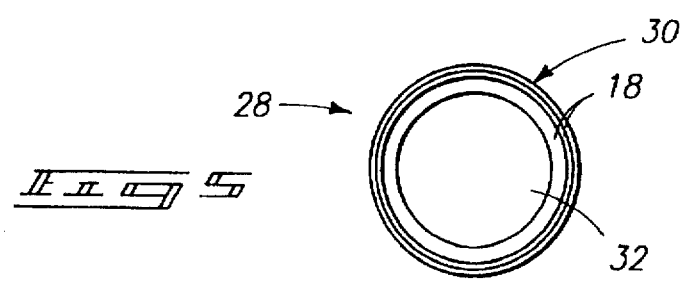

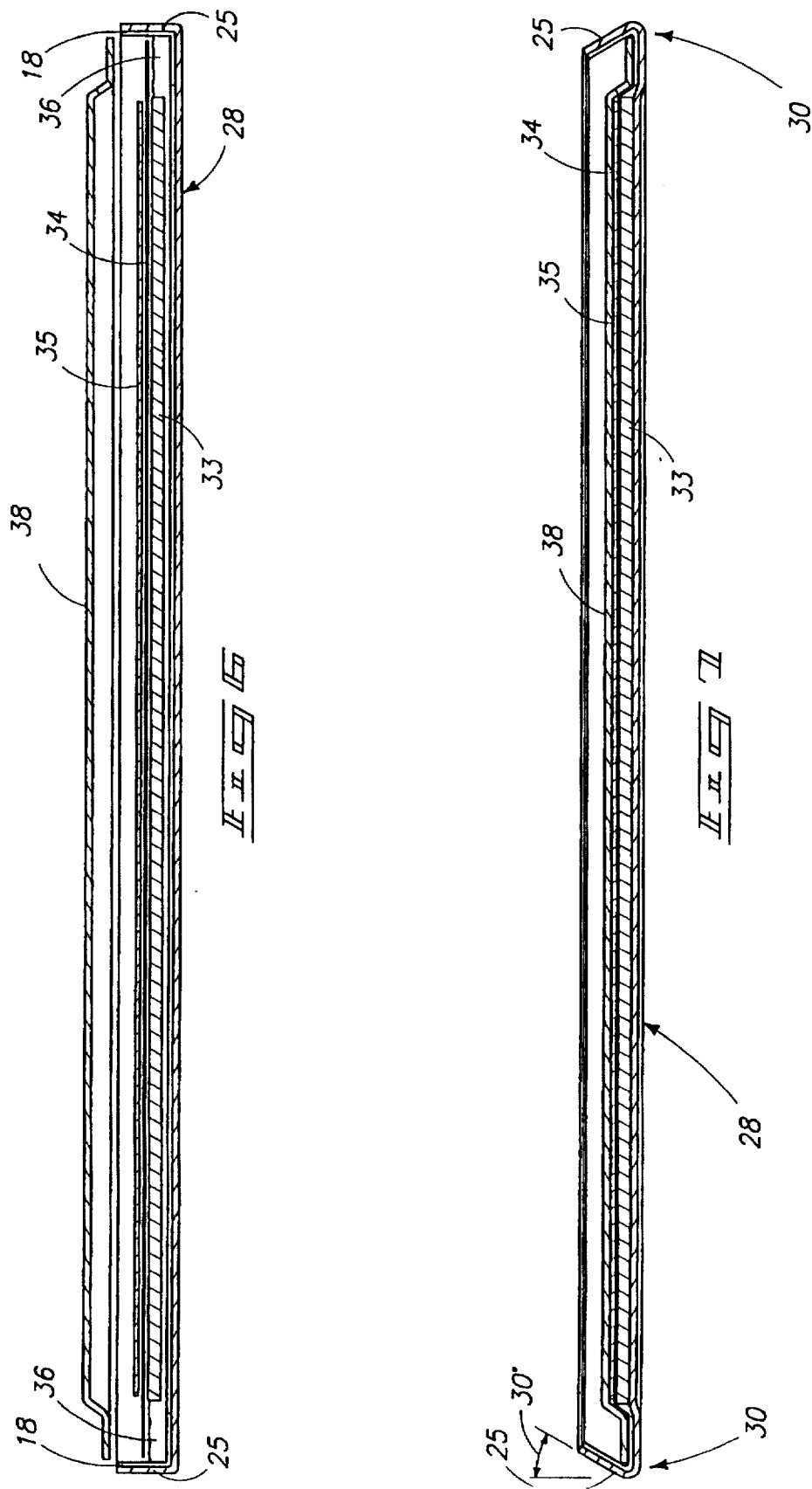

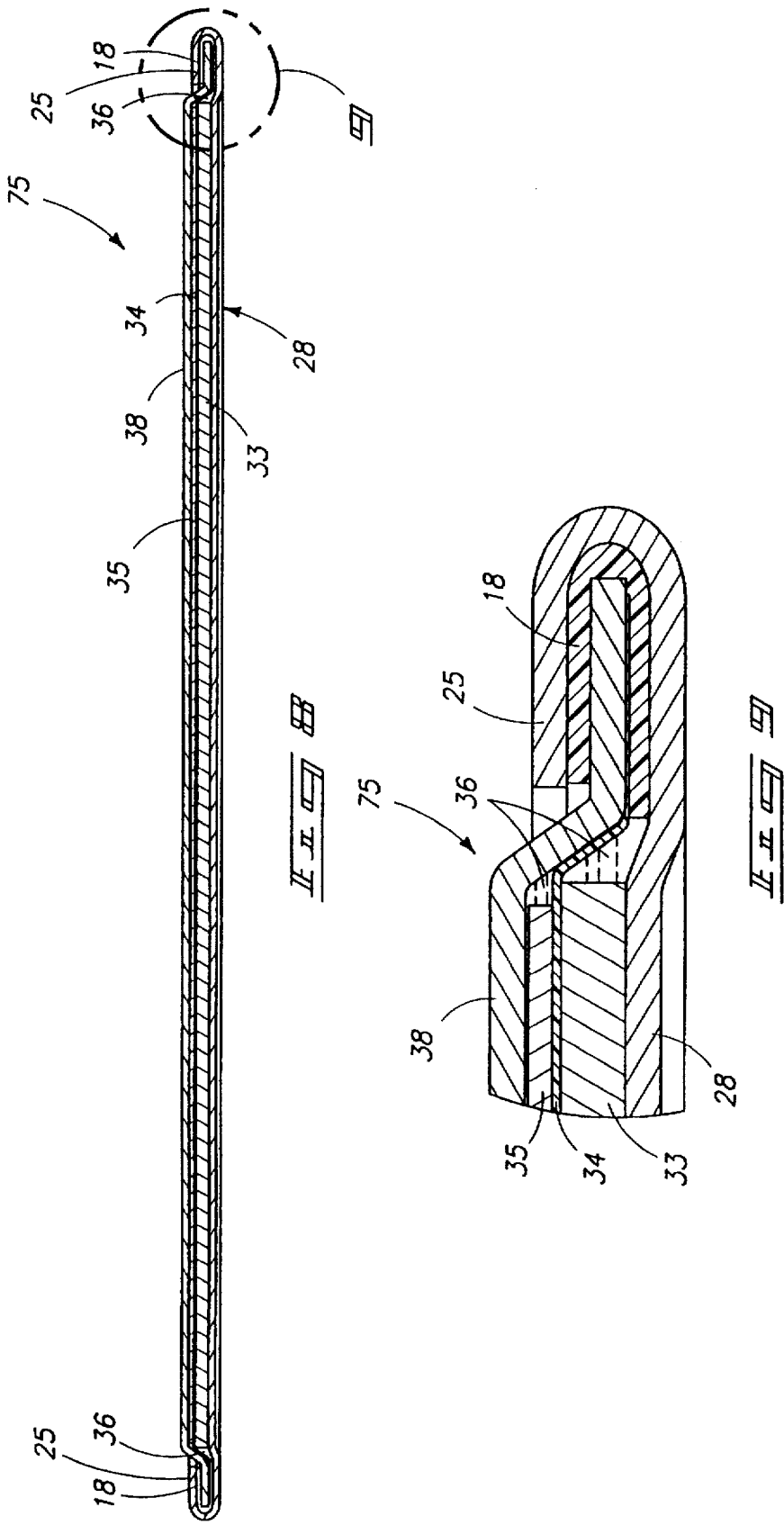

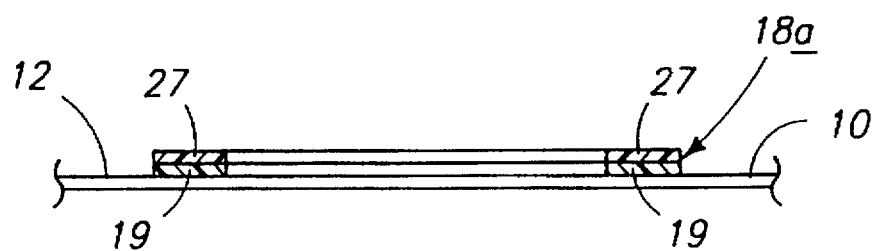
_Fig. 10_
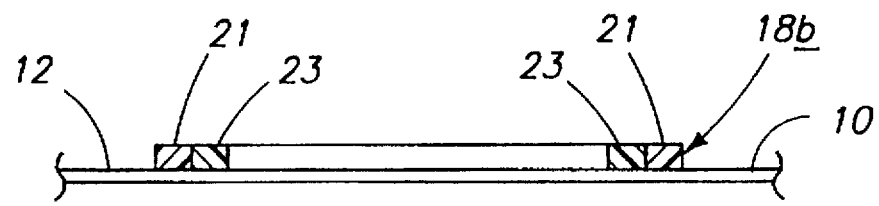
_Fig. 11_
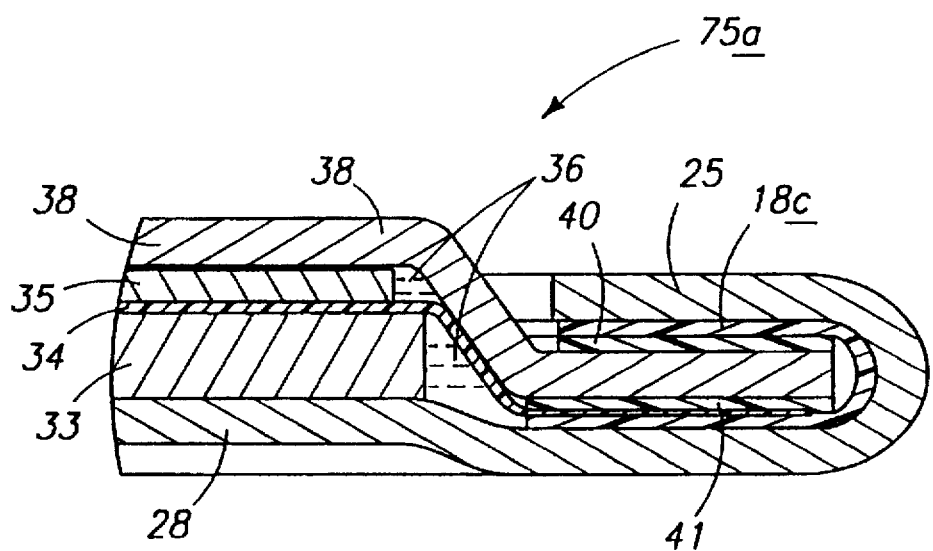
_Fig. 12_

METHODS OF PRODUCING THIN PROFILE BATTERIES AND A PLURALITY OF BATTERY TERMINAL HOUSING MEMBERS

RELATED PATENT DATA

This patent resulted from a continuation application of U.S. patent application Ser. No. 08/205,590, filed on Mar. 2, 1994, entitled "Methods Of Producing Button-Type Batteries And A Plurality Of Battery Terminal Housing Members" now U.S. Pat. No. 5,603,157 listing the inventors as Rickie Lake and Peter M. Blonsky.

TECHNICAL FIELD

This invention relates to methods of forming button-type batteries, and to methods of forming a plurality of battery terminal housing members.

BACKGROUND OF THE INVENTION

Button-type batteries are small thin energy cells that are commonly used in watches and other electronic devices requiring a thin profile. As the term is used herein, a button-type battery is a subset of a general class of batteries referred to as "thin profile batteries", with a thin profile battery being defined as a battery comprising a thickness less than a maximum linear dimension of the battery's anode. A conventional button-type battery includes an anode, a cathode, a porous separator separating the anode and cathode, and an electrolyte within the separator pores.

These internal battery components are housed within a metal casing or housing formed by a lower conductive can and an upper conductive lid. The can is typically in electrical contact with the cathode to form the positive battery terminal, and the lid is in electrical contact with the anode to form the negative battery terminal. The can and lid are crimped or pressed together to form a fluid-tight seal which entirely encloses the anode, cathode, separator, and electrolyte. An electrically insulating sealing gasket is provided within the primary seal between the lid and can to electrically insulate the two housing members.

There is a need in button-type battery usage to make such energy cells thinner. Today, the thinnest commercially available button-type battery has a thickness of 1.2 mm (47.2 mils). It would be desirable to make a thinner battery, particularly one having a thickness of less than 1 mm (39.4 mils). A countering concern, however, is that the integrity of the fluid-tight seal cannot be compromised simply to achieve the goal of thinner batteries.

It is also an objective in button-type battery design to create a housing structure which physically compresses the anode, separator, and cathode together to insure proper operation of the energy cell. This is in some cases accomplished in the prior art by a separate internal spring component which provides desired compressive forces.

It would be desirable to design improved button-type batteries of very thin profile which meet at least one or more of the above stated objectives.

One prior art technique for forming the sealed casing includes separately pre-forming each of the can, lid, and gasket. During assembly, the gasket must be aligned with and inserted into the can. Once the lid is positioned within the can, the can and gasket are crimped about the lid to form the fluid-tight seal. The use of the separate gasket which needs to be preformed and controllably inserted into the can results in increased thickness, higher manufacturing costs and longer assembly times. It would be desirable to enable size reduction, as well as reduce manufacturing costs and assembly time.

U.S. Pat. No. 3,713,896 to Feldhake discloses a technique for dipping the peripheral flange portion of a battery lid into an epoxy resin to form an insulating seal. The epoxy is then cured over time or through thermal techniques. While the Feldhake technique eliminates the separate gasket, it does not improve assembly time due to the lengthy coating and curing steps which also requires handling each part individually. It would therefore be desirable to provide a method for forming a button-type battery which minimizes processing steps and assembly time.

BRIEF DESCRIPTION OF THE DRAWINGS

Preferred embodiments of the invention are described below with reference to the following accompanying drawings. The same components and features illustrated throughout the drawings are referenced with like numerals.

FIG. 1 is a not-to-scale, diagrammatic, side sectional plan view of steps of a method in accordance with the invention.

FIG. 2 is top view of a sheet being treated in accordance with the FIG. 1 method steps, and corresponds in position to the steps diagrammatically evidenced by the FIG. 1 method.

FIG. 3 is an enlarged diagrammatic side sectional plan view of step conducted immediately subsequent the to the FIG. 1 series of steps.

FIG. 4 is a side cross-sectional view of a single battery terminal housing member produced according to the steps shown by FIGS. 1–3.

FIG. 5 is a top view of FIG. 4.

FIG. 6 is an enlarged, more-to-scale, cross-sectional, exploded view of a 20 mm diameter battery pre-assembly utilizing the FIGS. 4 and 5 housing member.

FIG. 7 is a cross-sectional view of the FIG. 6 assembly shown at a processing step subsequent to that shown by FIG. 6.

FIG. 8 is a cross-sectional view of an assembled button-type battery construction in accordance with the invention.

FIG. 9 is an enlarged cross-sectional view of a peripheral sealing portion of the FIG. 8 assembly.

FIG. 10 is an enlarged cross-sectional view of an alternate method step in accordance with the invention.

FIG. 11 is all enlarged cross-sectional view of another alternate method step in accordance with the invention.

FIG. 12 is a cross-sectional view of corresponding to that of FIG. 9, but showing an alternate assembly produced by alternate steps in accordance with the invention.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

This invention principally concerns "coin" or "button-type" batteries. A button-type battery is typically a small circular-shaped energy cell approximately the size of a coin. The button-type battery can be constructed in different sizes, with typical diameters being 12 mm, 16 mm, and 20 mm. Other shapes are possible, but the circular shape is most common.

In accordance with an aspect of the invention, a method of forming a button-type battery comprises the following steps:

providing an electrically conductive sheet having an exposed surface, the exposed surface being divisible into a plurality of areas;

depositing an uncured electrically insulative gasket material onto the conductive sheet into a plurality of the areas, the gasket material being deposited to define at least one discrete pattern within the respective deposited areas, the respective discrete patterns covering less than a total of their respective areas;

curing the deposited gasket material;

cutting and forming a plurality of discrete first terminal housing members from the areas of the conductive sheet, the respective first terminal housing members comprising at least a portion of one of the discrete patterns of gasket material;

providing a discrete electrically conductive second terminal housing member in facing juxtaposition to one of the first terminal housing members;

providing an anode and a cathode having a separator and electrolyte positioned therebetween; the anode, cathode, separator and electrolyte being positioned intermediate the juxtaposed first and second terminal housing members; the anode being positioned to electrically connect with one of the first or second terminal housing members and the cathode being positioned to electrically connect with the other of the first or second terminal housing members; and crimping the first and second terminal housing members together into an enclosed battery housing with the gasket material being interposed between the first and second terminal housing members to provide a fluid-tight seal and to provide electrical insulation therebetween.

Research culminating in the invention disclosed herein also resulted in other inventions. These other inventions are the subject of other U.S. patents which spawned from patent applications filed on the same day of the patent application from which this U.S. patent matured. These other patent applications are U.S. patent application Ser. No. 08/206,051 "Method Of Producing Button-Type Batteries And Spring-Biased Concave Button-Type Battery", listing John Tuttle and Mark E. Tuttle as inventors now U.S. Pat. No. 5,486,431; U.S. patent application Ser. No. 08/205,611, "Button-Type Battery With Improved Separator And Gasket Construction", listing Peter M. Blonsky and Mark E. Tuttle as inventors now U.S. Pat. No. 5,547,781; and U.S. patent application Ser. No. 08/205,957, "Button-Type Battery Having Bendable Construction, and Angled Button-Type Battery", listing Mark E. Tuttle and Peter M. Blonsky as inventors now U.S. Pat. No. 5,432,027. These co-filed patent applications and resulting patents are hereby incorporated by reference as if fully included herein.

Referring to the drawings, FIGS. 1-9 illustrate one preferred method of forming a button-type battery in accordance with the invention. The process starts in the utilization of an electrically conductive sheet 10 having an exposed outer surface 12. An example and preferred material for sheet 10 is Type 304 stainless steel having a nominal thickness of 4 mils (0.1016 mm). Outer surface 12 of sheet 10 can be considered as being divisible into a plurality of areas 14a, 14b, 14c, 14d, 14e, etc., which are collectively referred to as areas 14.

Conductive sheet 10 feeds to a deposition station 16 (FIG. 1) where uncured electrically insulative gasket material is deposited into areas 14 passing therebeneath such material is deposited to define at least one discrete pattern within the respective deposited areas 14, with the respective discrete patterns covering less than a total of their respective areas 14. An example and preferred gasket material is polymeric material, such as epoxy, which will effectively bond to outer surface 12. Most preferred are ultraviolet light curable epoxies, such as the many types available from Electronic Materials, Inc. Brookfield, Conn. Specific examples are provided below. Alternately, the gasket can be formed of other insulative materials, such as polyimide. In the preferred illustrated embodiment, the uncured insulative gasket material is provided in substantially liquid form by screen printing technique to precisely define the discrete patterns. FIGS. 1 and 2 show such preferred discrete patterns in the form of rings or donuts 18, preferably 1 mil (0.0254 mm) in thickness. The pattern deposited gasket material is subsequently allowed to cure.

Where the deposited material comprises ultraviolet light curable epoxy, sheet 10 is fed downstream from deposition station 16 to ultraviolet light curing station 20. One advantage in using ultraviolet light cured epoxy is a rapid and controllable cure rate as compared to other types of epoxy, resinous or plastic materials which cure by other means, such as cooling. As an example, ultraviolet light cured epoxy can cure in a few seconds. This is highly advantageous when rapid, substantially complete curing of the gasket material is desired prior to cutting and forming operations, as in the preferred embodiment of the invention. Rapid curing also reduces manufacturing time.

Sheet 10 passes from curing station 20 (FIG. 1) to a cutting and forming station 22 (FIG. 3). There, a plurality of discrete first terminal housing members are cut and formed from individual areas 14 of conductive sheet 10, with the respective first terminal housing members comprising at least a portion of one of the discrete patterns of gasket material. Specifically, station 22 comprises a cutting and forming tool having a ring die cutter 24 having an inner diameter that is preferably less than the outer diameter of ring shapes 18. Ring cutter 24 therefore cuts through the ting shapes 18 to ensure that the gasket material extends to the edges of the first terminal housing members. A central forming press 26 is sized to engage ring shapes 18 midway between their inner and outer circular peripheries.

The cutting and forming tool of station 22 is operated to form and cut material from sheet 10 to produce a plurality of discrete first terminal housing members from sheet 10, such as the one terminal housing member 28 illustrated in FIGS. 4 and 5. In the illustrated preferred embodiment, the cutting and forming defines a container having a 90° peripheral bend 30 extending continuously about a circular base 32 upwardly at 90°, thus defining sealing peripheral portions 25. The illustrated forming action includes bending of the adhered gasket material, and incorporation of a portion of each of rings 18 originally deposited on sheet 10.

Referring to FIG. 6, first terminal housing member 28 is provided with a cathode 33, porous separator 34, anode 35 and liquid electrolyte 36, which can be of conventional construction. For example, in the reduced to practice models, cathode 33 is formed of a compressed tablet made from a combination of manganese (IV) oxide, carbon, and teflon powder. An example preferred thickness of cathode 33 is 8 mils (0.2032 mm). Separator 34 is a woven or porous polymeric material, such as polyethylene, polypropylene, or teflon. An example preferred thickness of separator 34 is 1 mil (0.0254 mm). Anode 35 is formed of elemental lithium provided on a copper backed foil. An example thickness of anode 35 is 2 mils (0.0508 mm).

An example electrolyte 36 comprises a solution of propylene carbonate and ethylene glycol dimethylether, having dissolved lithium tetrafluoroborate. Suitable electrolyte components are supplied by Aldrich Chemical Company of Milwaukee, Wis. The volume of electrolyte 36 provided within first terminal housing member 28 is preferably gauged to fill the substantial void within housing member 28, yet not so great to leak out upon crimp sealing the battery assembly.

Referring further to FIG. 6, a separately formed discrete electrically conductive second terminal housing member 38 is provided in facing juxtaposition to first terminal housing member 28. An example material for second housing member 38 would again be Type 304 stainless steel having a thickness of 4 mils (0.1016 mm). The illustrated anode, cathode and separator and electrolyte are positioned intermediate first housing member 28 and second housing member 38. Anode 35 is positioned to ultimately electrically contact or otherwise electrically connect with second housing member 38, while cathode 33 is positioned to electrically contact or otherwise electrically connect with first housing member 28.

Referring to FIG. 7, second housing member 38 is pressed downwardly somewhat while sealing peripheral portions 25 are further bent inwardly from 90° about peripheral bend 30. In the preferred and illustrated embodiment, the initial bend past 90° is by an additional 30°. This partial crimp effectively, if only temporarily, holds second terminal housing member 38 in a desired position with anode 35, separator 34 and cathode 33 therebeneath. Further, this initial bend past 90° is understood to temporarily impart arcustc concavity to circular base portion 32 in the illustrated upward direction. This results from a combination of the thickness of sheet 10 (FIG. 1) and the radius of bend 30 being in combination effectively small that the resultant compressive stresses cause such upward contraction. An example radius of curvature in accordance with the above described preferred embodiment is 3.5 mils (0.0889 mm). The concave bending is believed to be temporary because continued bending of the peripheral portions of an empty first terminal housing member results in flattening of the arc and overall less indentation.

Referring to FIGS. 8 and 9, sealing peripheral portions 25 of first terminal housing member 28 are further bent about peripheral bend 30 to form a single continuous peripheral bend which effectively crimps first and second terminal housing members 28 and 38 together. Such effectively forms an enclosed battery housing 75 with gasket material in the form of rings 18 being interposed between such first and second terminal housing members to provide a fluid-tight seal and to provide electrical insulation therebetween. A battery made in accordance with the above example thickness components will have a finished total thickness of 0.5 mm (9.7 mils).

Modifications of the above described method are also of course contemplated, with the invention only being limited by the accompanying claims appropriately interpreted in accordance with the doctrine of equivalents. By way of example only, the method of depositing gasket material onto sheet 10 prior to cutting and forming could comprise multiple deposition steps whereby multiple layers of gasket material are successively layered onto the respective sheet areas in the shape of the one discrete pattern. For example, ring 18 could comprise multiple thinner layers applied in multiple screen printing stations, or by multiple passes of each area 14 within station 16.

Further, the multiple layers might be deposited to produce different compositions within the finished shape. For example, FIG. 10 shows an alternate ring 18a having a lower portion 19 comprised of a different material than an upper portion 27. Each portion 19 and 27 could of course be independently provided by a separate successive layering technique as described above. Utilizing different materials enables the battery designer to tailor or enhance the construction for different applications. For example, material of layer 27 in the finished construction is folded over to directly connect with the opposing outer terminal member. Material of portion 27 might accordingly be constructed of a comparatively soft conformal material to assure appropriate engagement with the outer opposing electrode. Likewise, material of portion 19 might comprise a comparatively structurally harder material. Ultraviolet light curable material of different resultant hardnesses are available from Electronics Materials, Inc., of Brookfield, Conn.

A further alternate technique for depositing electrically insulative gasket material onto sheet 10 in the form of a ring 18b is described with reference to FIG. 11. Such comprises depositing gasket material to define multiple patterns per area, such as the illustrated concentric and touching rings 21 and 23. The composition of such rings could also be different. The constructions of FIGS. 10 and 11 are shown to have flat upper surfaces, although a varying upper topography and any of a number of shapes could also be constructed.

The above described embodiment deposits gasket material onto the one lower terminal which functions as the initial container for retaining the internal battery components during crimping. The opposing battery terminal housing, such as terminal housing 28, could alternately be deposited with a desired pattern of insulative gasket material. Further as shown in FIG. 12, insulating gasket material could be provided on both the first and second terminal housing members in such a manner that the collective gasket material overlaps when the first and second housing members are juxtaposed and crimped. Specifically, FIG. 12 shows an alternate assembled battery 75a. Here, gasket material of a ring pattern 18c is deposited to half the thickness of ring pattern 18 of the first described embodiment. Layers 40 and 41 of gasket material are also provided on the peripheral portion of second terminal housing member 38.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A method of forming a thin profile battery defined by a thickness which is less than a maximum linear dimension of its anode, comprising the following steps:

providing an electrically conductive sheet having an exposed surface, the exposed surface being divisible into a plurality of sheet areas;

screen printing an uncured electrically insulative gasket material onto the conductive sheet into a plurality of the sheet areas to define at least one discrete pattern within each respective sheet area in which electrically insulative material is screen printed, wherein each respective discrete pattern covers less than a total of each respective sheet area, wherein the screen printed gasket material is deposited to a thickness of about 1 mil;

curing the screen printed gasket material;

cutting and forming a plurality of discrete first terminal housing members from the areas of the conductive sheet, the respective first terminal housing members comprising at least a portion of one of the discrete patterns of gasket material;

providing a discrete electrically conductive second terminal housing member in facing juxtaposition to one of the first terminal housing members;

providing an anode and a cathode having a separator and electrolyte positioned therebetween; the anode, cathode, separator and electrolyte being positioned intermediate the juxtaposed first and second terminal housing members; the anode being positioned to electrically connect with one of the first or second terminal housing members and the cathode being positioned to electrically connect with the other of the first or second terminal housing members; and crimping the first and second terminal housing members together into an enclosed thin profile battery housing with the gasket material being interposed between the first and second terminal housing members to provide a fluid-tight seal and to provide electrical insulation therebetween.

2. A method of forming a thin profile battery defined by a thickness which is less than a maximum linear dimension of its anode, comprising the following steps:

providing an electrically conductive sheet having an exposed surface, the exposed surface being divisible into a plurality of sheet areas;

depositing an uncured electrically insulative gasket material onto the conductive sheet into a plurality of the sheet areas, the gasket material being deposited to a thickness of about 1 mil, and to define at least one discrete pattern within each respective sheet area in which electrically insulative material is deposited, wherein each respective discrete pattern covers less than a total of each respective sheet area, and wherein the discrete patterns are discontinuous relative to one another;

curing the deposited gasket material;

cutting and forming a plurality of discrete first terminal housing members from the areas of the conductive sheet, the respective first terminal housing members comprising only a portion of one of the discrete patterns of gasket material;

providing a discrete electrically conductive second terminal housing member in facing juxtaposition to one of the first terminal housing members;

providing an anode and a cathode having a separator and electrolyte positioned therebetween; the anode, cathode, separator and electrolyte being positioned intermediate the juxtaposed first and second terminal housing members; the anode being positioned to electrically connect with one of the first or second terminal housing members and the cathode being positioned to electrically connect with the other of the first or second terminal housing members; and crimping the first and second terminal housing members together into an enclosed battery housing to form a thin profile battery, wherein the gasket material is interposed between the first and second terminal housing members to provide a fluid-tight seal and to provide electrical insulation therebetween.

3. A method of forming a plurality of battery terminal housing members comprising the following steps:

providing an electrically conductive sheet having an exposed surface, the exposed surface being divisible into a plurality of sheet areas;

depositing an uncured electrically insulative gasket material onto the conductive sheet into a plurality of the sheet areas by screen printing liquid epoxy onto the sheet areas to define at least one discrete pattern within each respective sheet area in which electrically insulative material is deposited, wherein each respective discrete pattern covers less than a total of each respective sheet area, wherein the screen printed liquid epoxy is deposited to a thickness of about 1 mil;

curing the deposited gasket material; and cutting and forming a plurality of discrete battery terminal housing members from the areas of the conductive sheet, the respective discrete terminal housing members comprising at least a portion of one of the discrete patterns of gasket material; the forming including bending the discrete first terminal housing members into desired battery terminal shapes.

4. A method of forming a plurality of battery terminal housing members comprising the following steps:

providing an electrically conductive sheet having an exposed surface, the exposed surface being divisible into a plurality of sheet areas;

depositing an uncured electrically insulative gasket material onto the conductive sheet into a plurality of the sheet areas, the gasket material being deposited to a thickness of about 1 mil, and to define at least one discrete pattern within each respective sheet area in which electrically insulative material is deposited, wherein each respective discrete pattern covers less than a total of each respective sheet area, and wherein the discrete patterns are discontinuous relative to one another;

curing the deposited gasket material; and cutting and forming a plurality of discrete battery terminal housing members from the areas of the conductive sheet, the respective discrete terminal housing members comprising only a portion of one of the discrete patterns of gasket material; the forming including bending the discrete first terminal housing members into desired battery terminal shapes.

5. A method of forming one or more battery terminal housing members comprising the following steps:

providing an electrically conductive sheet;

screen printing an uncured electrically insulative gasket material onto the conductive sheet to a thickness of about 1 mil;

curing the deposited gasket material; and cutting and bending the electrically conductive sheet to form one or more battery terminal housing members.

6. A method of forming gasket material on a battery terminal housing member comprising depositing ultraviolet light curable epoxy onto the battery terminal housing member.

7. A method of forming gasket material on a battery terminal housing member comprising screen printing gasket material onto the battery terminal housing member to a thickness of about 1 mil.

8. A method of forming gasket material on a battery terminal housing member comprising depositing gasket material onto the battery terminal housing member to a thickness of about 1 mil.

9. A method of forming a battery having a thickness of less than about 1 mm, the method comprising the following steps:

providing an electrically conductive sheet having an exposed surface, the exposed surface being divisible into a plurality of sheet areas;

depositing an uncured electrically insulative gasket material onto the conductive sheet into a plurality of the sheet areas to define at least one discrete pattern within each respective sheet area in which electrically insulative material is deposited, wherein each respective discrete pattern covers less than a total of each respective sheet area, and wherein the discrete patterns are discontinuous relative to one another;

curing the deposited gasket material;

cutting and forming a plurality of discrete first terminal housing members from the areas of the conductive sheet, the respective first terminal housing members comprising only a portion of one of the discrete patterns of gasket material;

providing a discrete electrically conductive second terminal housing member in facing juxtaposition to one of the first terminal housing members;

providing an anode and a cathode having a separator and electrolyte positioned therebetween; the anode, cathode, separator and electrolyte being positioned intermediate the juxtaposed first and second terminal housing members; the anode being positioned to electrically connect with one of the first or second terminal housing members and the cathode being positioned to electrically connect with the other of the first or second terminal housing members; and crimping the first and second terminal housing members together into an enclosed battery housing to form a battery having a thickness of less than about 1 mm, wherein the gasket material is interposed between the first and second terminal housing members to provide a fluid-tight seal and to provide electrical insulation therebetween.

10. A method of forming a battery having a thickness of less than about 1 mm, the method comprising the following steps:

providing an electrically conductive sheet having an exposed surface divisible into a plurality of sheet areas;

depositing an electrically insulative gasket material onto the conductive sheet into a plurality of the sheet areas to define at least one discrete pattern within each respective sheet area in which electrically insulative material is deposited, wherein the discrete patterns are discontinuous relative to one another;

cutting and forming a plurality of discrete first terminal housing members from the areas of the conductive sheet; and incorporating at least one of the first terminal housing members into a battery having a thickness of less than about 1 mm.

11. A method of forming a thin profile battery defined by a thickness which is less than a maximum linear dimension of its anode, comprising the following steps:

providing an electrically conductive sheet having an exposed surface, the exposed surface being divisible into a plurality of sheet areas;

depositing an uncured electrically insulative gasket material which comprises ultraviolet light curable epoxy onto the conductive sheet into a plurality of the sheet areas, the gasket material being deposited to define at least one discrete pattern within each respective sheet area in which electrically insulative material is deposited, wherein each respective discrete pattern covers less than a total of each respective sheet area;

curing the deposited gasket material by exposing the gasket material to ultraviolet light;

cutting and forming a plurality of discrete first terminal housing members from the areas of the conductive sheet, the respective first terminal housing members comprising at least a portion of one of the discrete patterns of gasket material;

providing a discrete electrically conductive second terminal housing member in facing juxtaposition to one of the first terminal housing members;

providing an anode and a cathode having a separator and electrolyte positioned therebetween; the anode, cathode, separator and electrolyte being positioned intermediate the juxtaposed first and second terminal housing members; the anode being positioned to electrically connect with one of the first or second terminal housing members and the cathode being positioned to electrically connect with the other of the first or second terminal housing members; and crimping the first and second terminal housing members together into an enclosed thin profile battery housing with the gasket material being interposed between the first and second terminal housing members to provide a fluid-tight seal and to provide electrical insulation therebetween.

12. A method of forming a thin profile battery defined by a thickness which is less than a maximum linear dimension of its anode, comprising the following steps:

providing an electrically conductive sheet having an exposed surface, the exposed surface being divisible into a plurality of sheet areas;

depositing uncured electrically insulative gasket material onto the conductive sheet into a plurality of the sheet areas by successively layering multiple gasket material layers onto the respective sheet areas in the shape of at least one discrete pattern within each respective sheet area in which electrically insulative material is deposited, wherein each respective discrete pattern covers less than a total of each respective sheet area, the multiple layers comprising at least two different compositions, the two different compositions comprising different ultraviolet light curable epoxies;

curing the deposited compositions by exposing the compositions to ultraviolet light;

cutting and forming a plurality of discrete first terminal housing members from the areas of the conductive sheet, the respective first terminal housing members comprising at least a portion of one of the discrete patterns of gasket material;

providing a discrete electrically conductive second terminal housing member in facing juxtaposition to one of the first terminal housing members;

providing an anode and a cathode having a separator and electrolyte positioned therebetween; the anode, cathode, separator and electrolyte being positioned intermediate the juxtaposed first and second terminal housing members; the anode being positioned to electrically connect with one of the first or second terminal housing members and the cathode being positioned to electrically connect with the other of the first or second terminal housing members; and crimping the first and second terminal housing members together into an enclosed thin profile battery housing with the gasket material being interposed between the first and second terminal housing members to provide a fluid-tight seal and to provide electrical insulation therebetween.

13. A method of forming a thin profile battery defined by a thickness which is less than a maximum linear dimension of its anode, comprising the following steps:

providing an electrically conductive sheet having an exposed surface, the exposed surface being divisible into a plurality of sheet areas;

depositing uncured electrically insulative gasket material onto the conductive sheet into a plurality of the sheet areas, the gasket material being deposited to define at least two patterns within each respective sheet area in which electrically insulative material is deposited, the two patterns comprising different electrically insulating gasket compositions, wherein the at least two patterns in a respective sheet area comprise a combined area which is less than a total of the respective sheet area in which they are deposited;

curing the at least two patterns of deposited gasket material;

cutting and forming a plurality of discrete first terminal housing members from the areas of the conductive sheet, the respective first terminal housing members comprising at least a portion of one of the discrete patterns of gasket material;

providing a discrete electrically conductive second terminal housing member in facing juxtaposition to one of the first terminal housing members;

providing an anode and a cathode having a separator and electrolyte positioned therebetween; the anode, cathode, separator and electrolyte being positioned intermediate the juxtaposed first and second terminal housing members; the anode being positioned to electrically connect with one of the first or second terminal housing members and the cathode being positioned to electrically connect with the other of the first or second terminal housing members; and crimping the first and second terminal housing members together into an enclosed thin profile battery housing with the gasket material being interposed between the first and second terminal housing members to provide a fluid-tight seal and to provide electrical insulation therebetween.

14. A method of forming a plurality of battery terminal housing members comprising the following steps:

providing an electrically conductive sheet having an exposed surface, the exposed surface being divisible into a plurality of sheet areas;

printing an uncured electrically insulative gasket material onto the conductive sheet into a plurality of the sheet areas, the gasket material being printed to a thickness of about 1 mil, and to define at least one discrete pattern within each respective sheet area in which electrically insulative material is printed, wherein each respective discrete pattern covers less than a total of each respective sheet area, and wherein the discrete patterns are discontinuous relative to one another;

curing the printed gasket material; and cutting and forming a plurality of discrete battery terminal housing members from the areas of the conductive sheet, the respective discrete terminal housing members comprising only a portion of one of the discrete patterns of gasket material; the forming including bending the discrete first terminal housing members into desired battery terminal shapes.

15. A method of forming one or more battery terminal housing members comprising the following steps:

providing an electrically conductive sheet;

printing an uncured electrically insulative gasket material onto the conductive sheet to a thickness of about 1 mil;

curing the printed gasket material; and cutting and bending the electrically conductive sheet to form one or more battery terminal housing members.

* * * * *

UNITED STATES PATENT AND TRADEMARK OFFICE
CERTIFICATE OF CORRECTION

PATENT NO. : 5,730,761
DATED : March 24, 1998
INVENTOR(S) : Rickie Lake; Peter M. Blonsky It is certified that error appears in the above-identified patent and that said Letters Patent is hereby corrected as shown below:

Column 2, l. 26: Insert --a-- between "of" and "step".

Column 3, l. 64: Delete "therebeneath such" and replace with --therebeneath. Such--.

Column 4, l. 36: Replace "ting" with --ring--.

Column 5, l. 29: Replace "arcustc" with --arcuate--.

Column 5, l. 52: Replace "(9.7 mils)" with --(19.7 mils)--.

Signed and Sealed this

Ninth Day of June, 1998

Attest:

BRUCE LEHMAN

*Attesting Officer*  Commissioner of Patents and Trademarks